H. G. HOWITT, W. J. PRICHARD AND J. EVANS.
INTERNAL COMBUSTION ROTARY ENGINE AND THE LIKE.
APPLICATION FILED MAY 21, 1920.

1,354,189. Patented Sept. 28, 1920.

INVENTORS
H. G. Howitt,
W. J. Prichard & J. Evans.

BY E. Higgins

ATTORNEY

UNITED STATES PATENT OFFICE.

HERBERT GEORGE HOWITT AND WYNDHAM JAMES PRICHARD, OF MERTHYR TYDFIL, WALES, AND JOHN EVANS, OF ELTHAM, LONDON, ENGLAND.

INTERNAL-COMBUSTION ROTARY ENGINE AND THE LIKE.

1,354,189.   Specification of Letters Patent.   Patented Sept. 28, 1920.

Application filed May 21, 1920. Serial No. 383,328.

*To all whom it may concern:*

Be it known that we, HERBERT GEORGE HOWITT, WYNDHAM JAMES PRICHARD, and JOHN EVANS, subjects of His Majesty the King of England, and residents of Merthyr Tydfil, Wales, Great Britain, and Eltham, in the county of London, England, respectively, have invented certain new and useful Improvements in or Relating to Internal-Combustion Rotary Engines and the like, of which the following is a specification.

This invention is for improvements in or relating to rotary internal combustion engines and has for its object to provide a more efficient construction than has heretofore been proposed. The rotary internal combustion engine according to the present invention is of the type which comprises a central member to rotate between side covers connected around their outer edges by a member with an interior undulating surface to form a closed casing with chambers eccentric to the central member, vanes engaging the said undulating member at their outer ends and mounted to slide radially or approximately so in said central member during the rotation of the latter, and cams engaging the vanes to cause them to slide in the central member during rotation, such chambers being so arranged that, in a pair, one serves as the intake and initial compression chamber and the other as the final compression and explosion chamber and the explosive mixture being passed through a suitable conduit from the one chamber to the other and finally exhausted from the latter by the rotation of the vanes with the central member.

According to the primary feature of the present invention a rotary internal combustion engine of the type above described is provided in which the chambers in a pair can be connected by a conduit in the casing one of the ends of which conduit opens into one of the chambers and the other end opens to the surface of the rotary central member which is recessed at intervals and during rotation alternately closes the conduit end and connects it to the body of the other chamber. This construction and arrangement provides for a compressed charge to be conveyed from one chamber to the other in an efficient manner and at an appropriate time in the cycle of operations.

According to another feature of the invention, where inlet and exhaust conduits open into the adjacent ends of two chambers, there is provided intermediate these two conduits a spring-pressed closure member to coöperate with the recesses in the rotary central member and prevent these two conduits from being placed in direct communication with each other.

For a more complete understanding of the invention, reference is directed to the accompanying drawings which show one constructional form of rotary engine according to the invention. It is to be understood however that the invention is not limited to the precise constructional details enumerated as these are given by way of example only.

In the accompanying drawings:—

Like letters of reference indicate like parts throughout the drawings.

Figure 1:
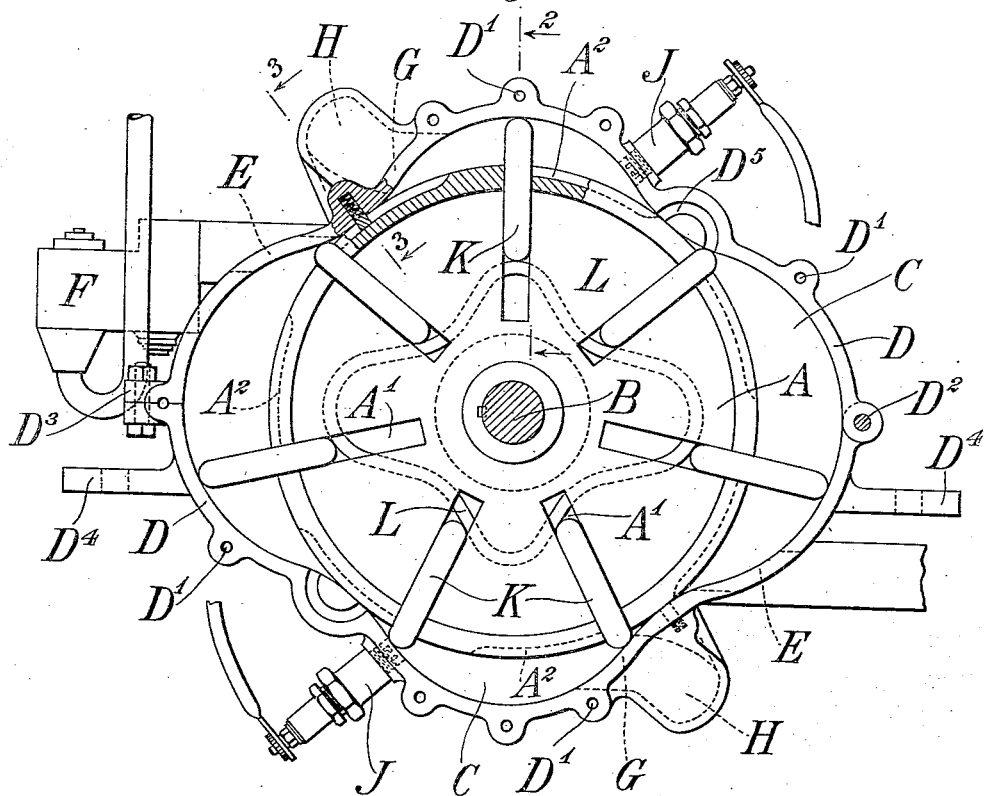
Figure 1 is a side elevation, partly in section, of the engine with one side cover removed.
Figure 2:
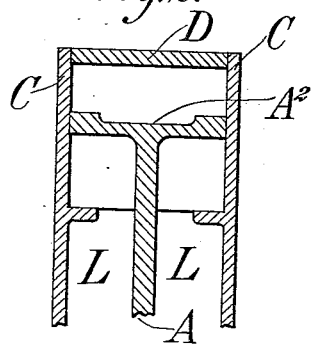
Fig. 2 is a partial cross-section on the line 2—2 in Fig. 1.
Figure 3:
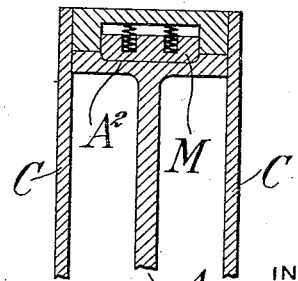
Fig. 3 is another partial cross-section on the line 3—3 in Fig. 1.

The engine comprises a central member or rotor A keyed upon a shaft B to rotate therewith. Upon each side of the central member is a cover plate C and these side cover plates C are connected around their outer edges by a member D with an interior undulating surface. The members C and D have, in the construction illustrated, ears or lugs for bolt holes $D^1$. The member D, which, with associated parts, constitutes the stator of the engine is shown as being in two parts hinged at $D^2$ and bolted together at $D^3$, and extensions $D^4$ are shown for mounting the engine in place upon any suitable support. It will be seen that the interior surface of the member D in conjunction with the side plates C and central member A forms four chambers eccentric to the central member A. This number of chambers is not essential since two or any multiple of two chambers may be employed.

In the construction illustrated it will be seen that two of the chambers are each larger than each of the other two chambers, and the chambers are intended to work in pairs, namely one large and one small chamber to each pair. The larger chambers each have ports E for the supply to them of explosive mixture, say from a carbureter F, and the small chambers each have ports G communicating with exhaust conduits H. The smaller chambers each have also a sparking plug J. The larger chambers are each intended to serve as an intake and initial compression chamber and the smaller chambers are each intended to serve as a final compression and explosion chamber.

The central member A is slotted at A¹ to receive vanes K which engage the undulating surface of the member D at their outer ends and are mounted to slide in the slots A¹ which are radial or approximately so in the member A. A cam L is provided with which the vanes K engage and are thus caused to slide in the central member during the rotation thereof.

The chambers are connected into pairs by conduits D⁵ in the member D. These conduits D⁵ are in the nature of by-passes and each opens at one end to the surface of the member A and at the other end to the interior of an intake and initial compression chamber. The surface of the member A is recessed at intervals at A² and during rotation operates alternately to close a conduit end or to connect it to the body of one of the final compression and explosion chambers. It will be appreciated that instead of the conduits D⁵ opening at one end into an intake and initial compression chamber they could open at that end into a final compression and explosion chamber.

It will be seen that each inlet port or conduit E is adjacent an exhaust port or conduit G. To prevent the recess A² placing these two conduits in communication with each other a spring-pressed closure member M is provided. This member M is housed in the undulating member D and is shaped transversely to correspond to the shape of the recess A². As the central member A rotates, the closure member M will, under the influence of these springs, enter the recesses A² passing under it and thus shut off communication between the conduits E and G. The rear ends of the recesses A² are shaped to act as cams to push the closure members M into their housings during rotation of the central member A.

In operation it will be seen that an explosive charge will enter through the port E, behind a vane K. The vane immediately following will carry this charge around and compress it through the by-pass D⁵ and a recess A² coöperating therewith, into the companion chamber. This situation is illustrated at the top of Fig. 1 wherein there will be a compressed charge between the vertical vane and the sparking plug. A spark from the latter ignites this charge and the vane and with it the central member A, are caused to rotate. In this rotation the exhaust port G would in due course be exposed and the following vane would sweep the products of combustion out therethrough.

In the construction illustrated there are two pairs of chambers and seven vanes. Consequently for each complete revolution of the central member A there will be fourteen explosions. It is, of course, not essential to employ this particular number of chambers and vanes.

What we claim is:—

1. A rotary internal combustion engine, comprising a rotor, a stator surrounding the rotor and defining, with the rotor, pairs of chambers for the reception and ignition of explosive charges, conduits in the stator between one chamber of a pair and the next chamber in order of the same pair, means for conducting an explosive charge into the first chamber in order of each pair, means for conducting gases of combustion from the second chamber of each pair, projectable and retractable vanes carried by the rotor with the periphery of the rotor provided with longitudinally arranged grooves each associated with a vane, division members carried by the stator between each pair of chambers and adapted and having a constant tendency to enter the grooves in the periphery of the rotor.

2. A rotary internal combustion engine, comprising a rotor with a cylindrical outer surface, a stator surrounding the rotor and having an internal undulatory surface with the outer surface of the rotor and the inner surface of the stator co-acting to define a plurality of pairs of adjacent chambers with one chamber of each pair longer than the companion chamber of the same pair, the rotor having peripherally extended grooves in its outer surface and the stator having as many spaced conduits in its inner surface as there are pairs of chambers whereby to contact the adjacent ends of the chambers of a pair, division members carried by the stator and adapted to enter the grooves in the rotor, said division members being located at the points of close approach of the rotor and stator between the pairs of chambers and having a constant tendency to enter the grooves, and projectable and rotatable vanes carried by the rotor and movable into the chambers in the stator to subdivide the latter and travel in and out of the chambers in accordance with the contours of the undulations in the stator, and intake, exhaust and firing means for each pair of chambers.

3. A rotary internal combustion engine comprising a rotor, a series of radial projectable and retractable vanes carried by the rotor, means for causing the projection and retraction of the vanes by the rotation of the rotor, and a stator surrounding the rotor and provided with an interior undulating surface forming in conjunction with the rotor a series of large and small chambers in the stator entered by the vanes, each larger chamber having a conduit at one end and in conjunction with a vane delivering a charge into the next succeeding smaller chamber for the firing of the charge in said smaller chamber, and each larger chamber having an intake for explosive charges at the end remote from the conduit, and each smaller chamber having an exhaust port at the end remote from the transfer conduit, the rotor also being provided with peripherally located grooves longitudinally extended to and including the transfer conduits throughout a portion of the travel of the rotor.

4. A rotary internal combustion engine, comprising a rotor with a cylindrical outer surface, a stator surrounding the rotor and having an internal undulatory surface with the outer surface of the rotor and the inner surface of the stator co-acting to define a plurality of pairs of adjacent chambers with one chamber of each pair longer than the companion chamber of the same pair, the rotor having peripherally extended grooves in its outer surface and the stator having as many spaced conduits in its inner surface as there are pairs of chambers whereby to connect the adjacent ends of the chambers of a pair, division members carried by the stator and adapted to enter the grooves in the rotor, said division members being located at the points of close approach of the rotor and stator between the pairs of chambers and having a constant tendency to enter the grooves, and projectable and retractable vanes carried by the rotor and movable into the chambers in the stator to subdivide the latter and travel in and out of the chambers in accordance with the contours of the undulations in the stator, and intake, exhaust and firing means for each pair of chambers, there being an odd number of vanes, with the total number of vanes greater than the number of chambers.

5. A rotary internal combustion engine, comprising a cylindrical rotor, a series of protractable and retractable vanes carried by the rotor, and a stator surrounding and inclosing the rotor and having an inner undulating surface engaging the rotor at spaced points and between them defining pairs of chambers, each consisting of a relatively large intake chamber and a relatively small explosion chamber with means of communication at their adjacent ends, the larger chamber of a pair having its intake at the end remote from the explosion chamber of the same pair and said explosion chamber having its outlet or exhaust at the end distant from the first named chamber of the same pair, the rotor being provided with peripheral channels arranged circumferentially thereof and the stator having projecting ducts where engaging the peripheral surface of the rotor, whereby to place the chambers of the same pair in communication at the point of closest approach of the outer wall of the rotor and inner wall of the stator.

In testimony whereof we have hereunto signed our names.

HERBERT GEORGE HOWITT.
WYNDHAM JAMES PRICHARD.
JOHN EVANS.